United States Patent
Nowaczyk et al.

(10) Patent No.: US 9,080,634 B2
(45) Date of Patent: Jul. 14, 2015

(54) SHOCK ABSORBER WITH FREQUENCY DEPENDENT PASSIVE VALVE

(71) Applicant: Tenneco Automotive Operating Company Inc., Lake Forest, IL (US)

(72) Inventors: Mark Nowaczyk, Heers (BE); Gunther Bismans, Alken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 32 days.

(21) Appl. No.: 13/950,423

(22) Filed: Jul. 25, 2013

(65) Prior Publication Data

US 2015/0027829 A1     Jan. 29, 2015

(51) Int. Cl.
*F16F 9/50* (2006.01)
*F16F 9/34* (2006.01)
*F16F 9/18* (2006.01)
*F16F 9/32* (2006.01)

(52) U.S. Cl.
CPC . *F16F 9/50* (2013.01); *F16F 9/182* (2013.01); *F16F 9/185* (2013.01); *F16F 9/3214* (2013.01); *F16F 9/34* (2013.01)

(58) Field of Classification Search
CPC ............. F16F 9/18; F16F 9/19; F16F 9/3214; F16F 9/34; F16F 9/3405; F16F 9/50; F16F 9/504; F16F 9/512
USPC ............. 188/275, 280, 313, 320, 316, 322.15
See application file for complete search history.

(56) References Cited

U.S. PATENT DOCUMENTS

| | | | |
|---|---|---|---|
| 5,129,488 A | 7/1992 | Furuya et al. | |
| 5,248,014 A * | 9/1993 | Ashiba ....................... | 188/282.8 |
| 5,386,892 A | 2/1995 | Ashiba | |
| 2012/0160624 A1 | 6/2012 | Katayama et al. | |
| 2013/0056317 A1 | 3/2013 | Kim | |
| 2013/0140117 A1 | 6/2013 | Yu | |

FOREIGN PATENT DOCUMENTS

JP   05302639 A  * 11/1993
JP   08-135715    5/1996

OTHER PUBLICATIONS

Search Report and Written Opinion dated Sep. 24, 2014 in corresponding PCT Application No. PCT/US2014/038880 (12 pages).

* cited by examiner

*Primary Examiner* — Anna Momper
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a frequency dependent valve assembly attached to the piston rod which defines a housing attached to the piston rod and a piston disposed within the housing. The piston moves within the housing to control the fluid flow through a bypass fluid passage that bypasses the piston assembly.

14 Claims, 4 Drawing Sheets

SHOCK ABSORBER WITH FREQUENCY DEPENDENT PASSIVE VALVE

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in both rebound and compression strokes.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during an extension or rebound movement of the hydraulic damper or shock absorber. Thus, there is a need for a frequency dependent selective damping device that provides the ability to have softer damping characteristics in both rebound and compression movements of the hydraulic damper or shock absorber in response to the higher frequency road inputs.

The continued development of hydraulic dampers includes the development of frequency dependent damping devices that function in both an extension or rebound movement and a compression movement of the hydraulic damper or shock absorber.

SUMMARY OF THE INVENTION

The present disclosure provides the art with a frequency dependent hydraulic damper or shock absorber that provides soft damping in both rebound and compression strokes of the hydraulic damper or shock absorber. Soft damping is provided for the higher frequency road inputs in both the extension and/or rebound stroke and the compression stroke of the hydraulic damper or shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
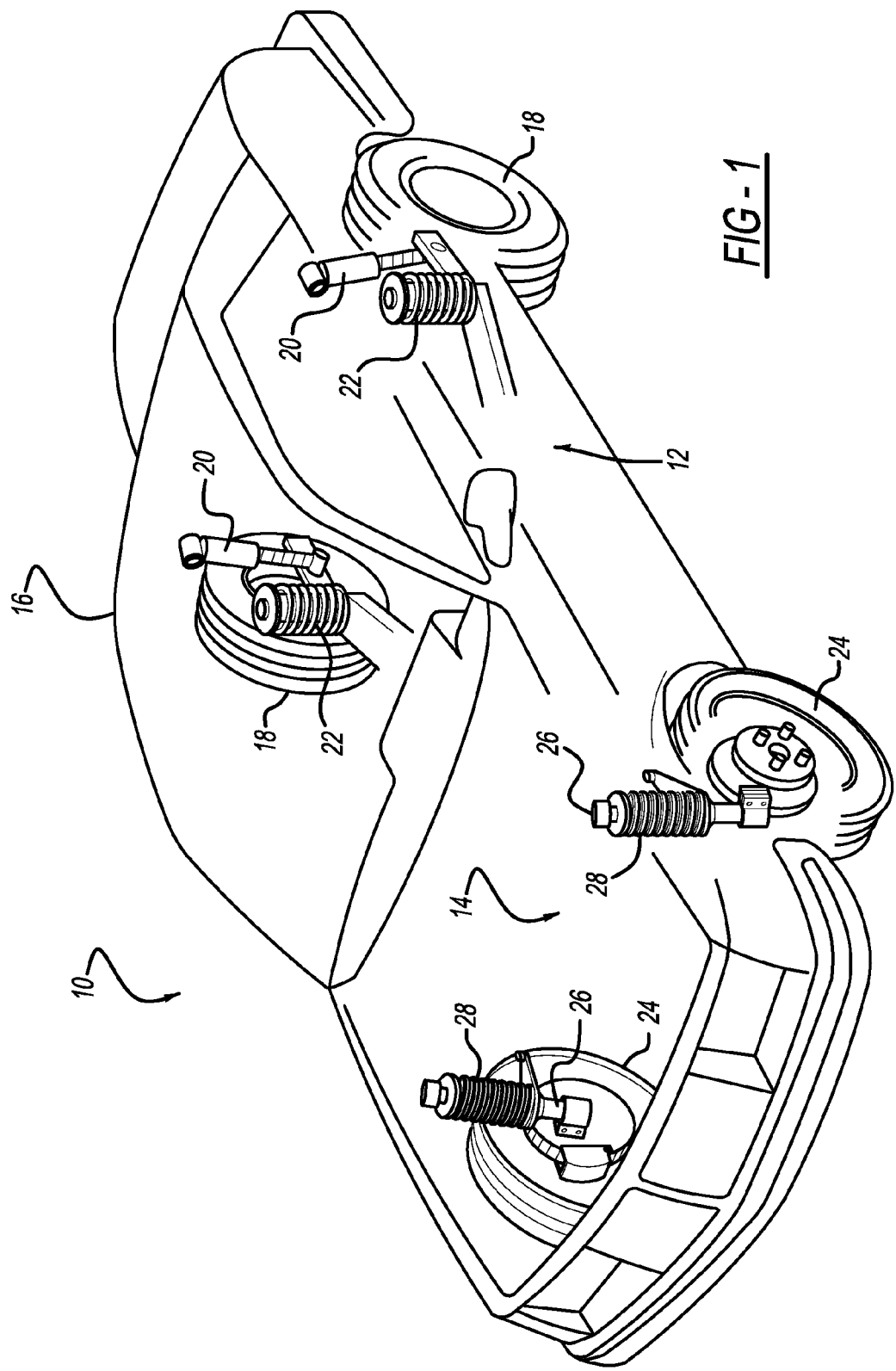
FIG. 1 is an illustration of an automobile using shock absorbers incorporating the frequency dependent damping device in accordance with the present disclosure.

Referring now to the drawings in which like reference numerals designate like or corresponding parts throughout the several views, there is shown in FIG. 1 a vehicle incorporating a suspension system having a plurality of frequency dependent shock absorbers in accordance with the present disclosure, the system being designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
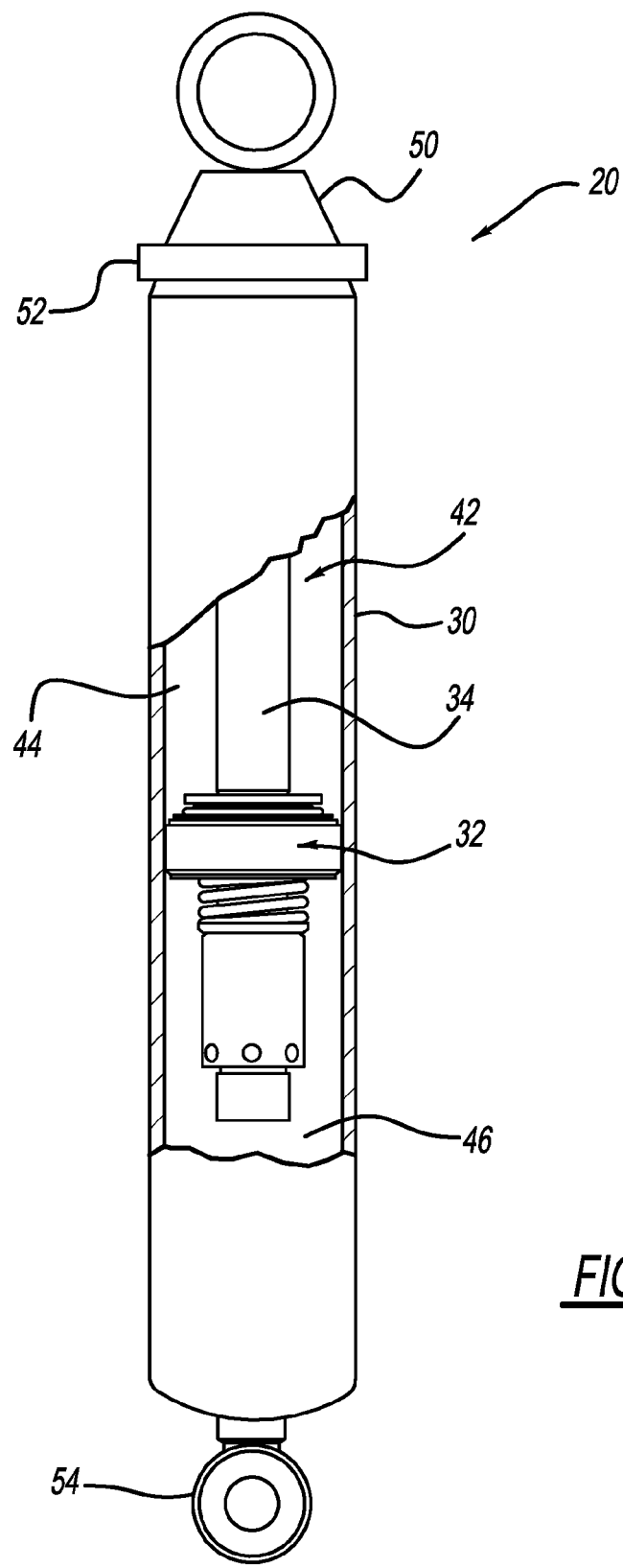
FIG. 2 is a cross-sectional side view of a monotube shock absorber incorporating the frequency dependent damping device in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 (visible in FIG. 3) is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the unsprung portion of the vehicle 10. In the preferred embodiment fitting 54 is secured to the unsprung portion of the vehicle 10. Thus, suspension movements of the vehicle 10 will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
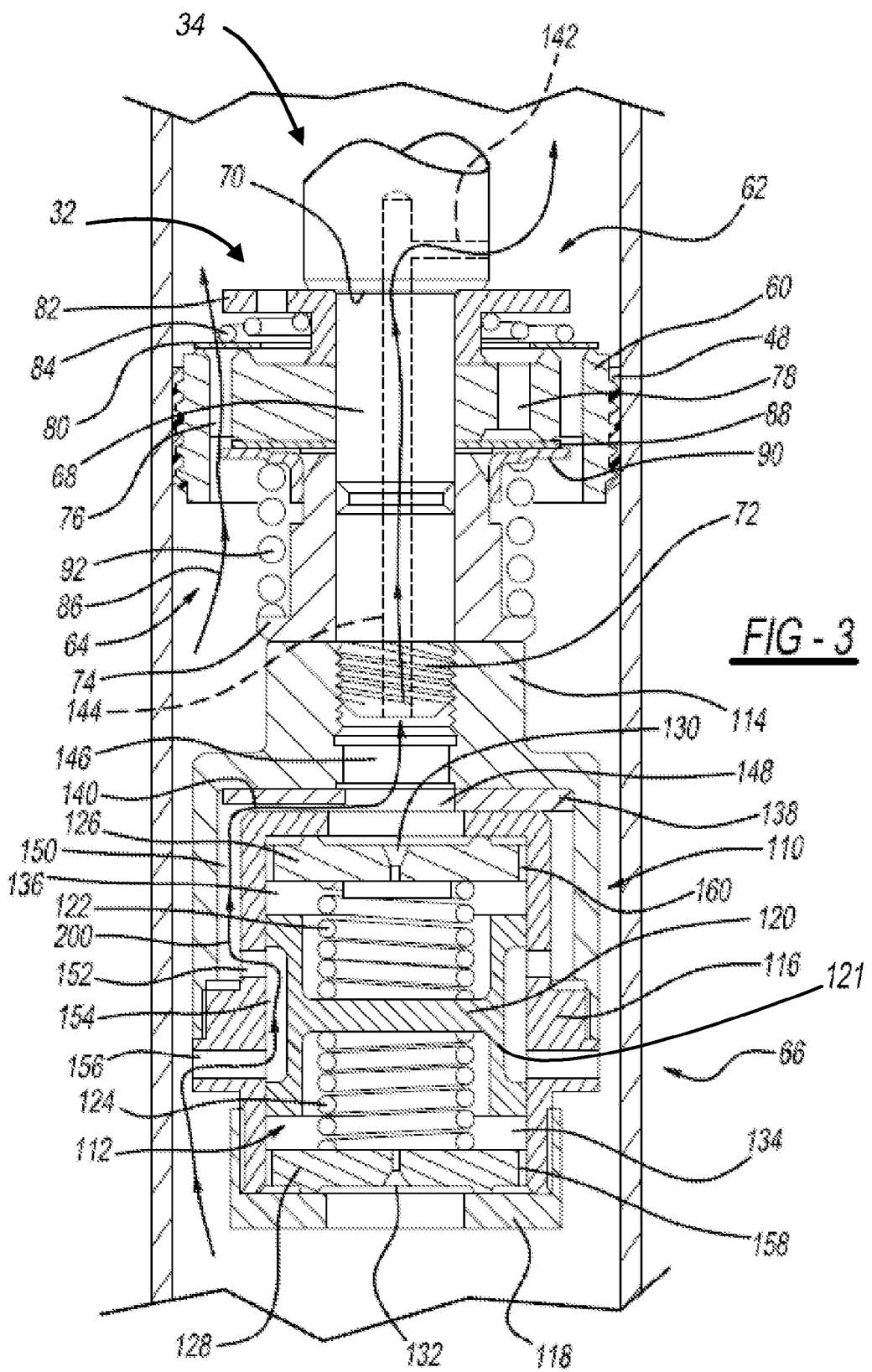
FIG. 3 is an enlarged cross-sectional side view illustrating the piston assembly of the shock absorber shown in FIG. 1 during a compression stroke of the shock absorber.
Figure 4:
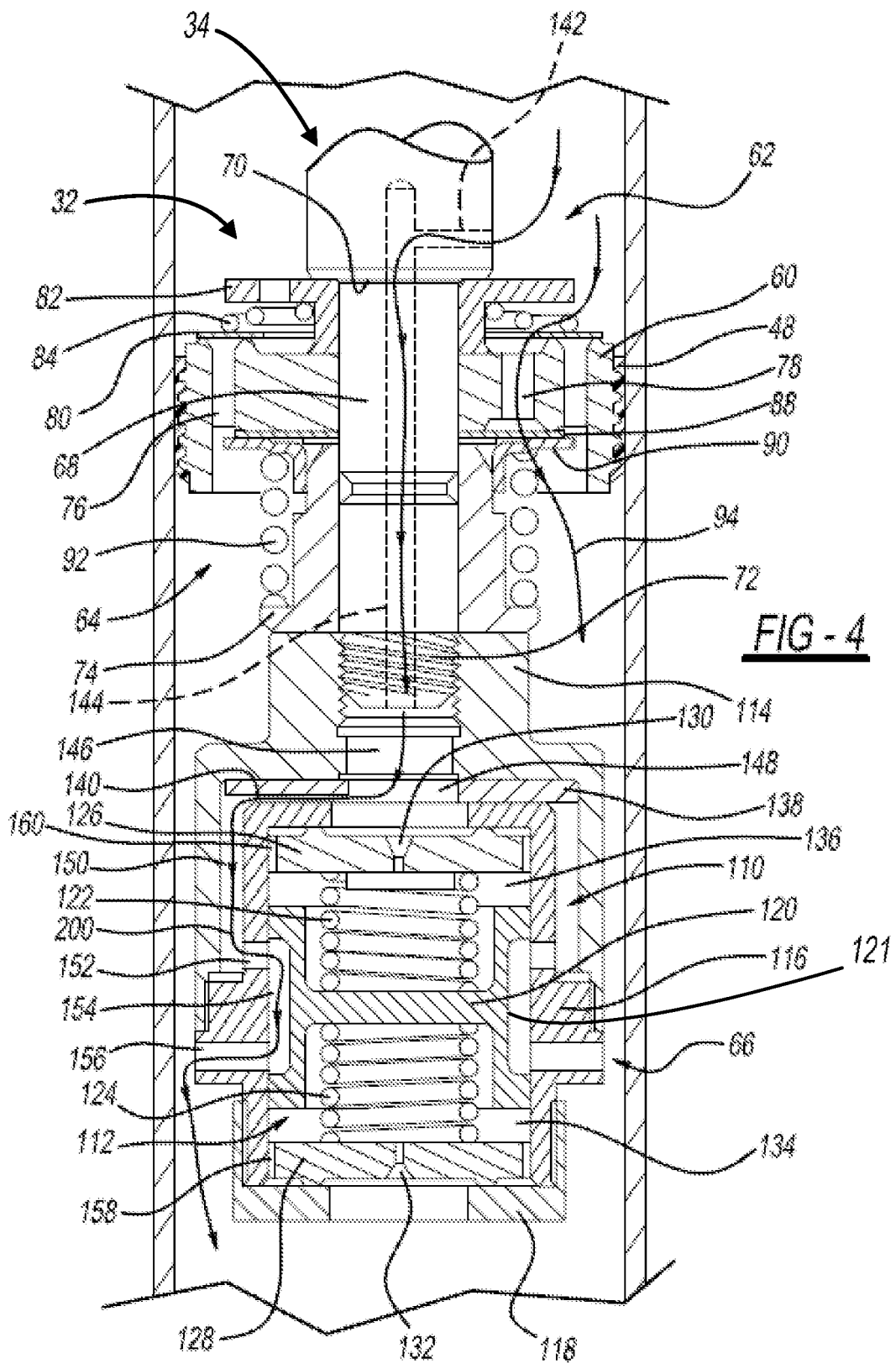
FIG. 4 is an enlarged cross-sectional side view illustrating the piston assembly of the shock absorber shown in FIG. 1 during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a frequency dependent valve assembly 66. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70. A rebound valve assembly 64 is located between piston body 60 and a threaded end 72 of piston rod 34. A retaining nut 74 is threadingly or slidingly received on threaded end 72 or reduced diameter section 68 of piston rod 34 to secure piston body 60, compression valve assembly 62 and extension or rebound valve assembly 64 to piston rod 34. Piston body 60 defines a plurality of compression flow passages 76 and a plurality of rebound flow passages 78.

Compression valve assembly 62 comprises a compression valve plate 80, a valve stop 82 and a spring 84. Valve plate 80 is disposed adjacent to piston body 60 to cover the plurality of compression flow passages 76. Valve stop 82 is disposed adjacent shoulder 70 and spring 84 is disposed between valve plate 80 and valve stop 82 to bias valve plate 80 against piston body 60. During a compression stroke of shock absorber 20, fluid pressure builds up in lower working chamber 46 until the fluid pressure applied to valve plate 80 through compression flow passages 76 overcomes the load provided by spring 84. Valve plate 80 will move away from piston body 60 and compress spring 84 to open compression flow passages 76 to allow fluid to flow from lower working chamber 46 to upper working chamber 44 as shown by arrow 86 in FIG. 3.

Rebound valve assembly 64 comprises one or more valve plates 88, a spring seat 90 and a spring 92. Valve plates 88 are disposed adjacent to piston body 60 to cover the plurality of rebound flow passages 78. Spring seat 90 is disposed immediately adjacent valve plates 88. Spring 92 is disposed between spring seat 90 and retaining nut 74 to bias spring seat 90 against valve plates 88 and valve plates 88 against piston body 60. Retaining nut 74 is threaded or slidingly received onto threaded end 72 or reduced diameter section 68 of piston rod 34 to retain valve plates 88 against piston body 60 to close rebound flow passages 78 using spring 92 and spring seat 90. During an extension stroke of shock absorber 20, fluid pressure builds up in upper working chamber 44 until the fluid pressure applied to valve plates 88 through rebound flow passages 78 overcomes the load provided by spring 92. Valve plates 88 will move away from piston body 60 and compress spring 92 to open rebound flow passages 78 to allow fluid to flow from upper working chamber 44 to lower working chamber 46 as shown by arrow 94 in FIG. 4.

Referring now to FIGS. 3 and 4, frequency dependent valve assembly 66 is illustrated. Frequency dependent valve assembly 66 comprises a housing assembly 110 and a piston assembly 112. Housing assembly 110 includes an upper housing 114, a middle housing 116 and a lower housing 118. Upper housing 114 is threadingly or otherwise attached to the end of piston rod 34. Middle housing 116 is threadingly or otherwise attached to upper housing 114. Lower housing 118 is threadingly or otherwise attached to middle housing 116.

Piston assembly 112 includes a piston 120 having an outer surface portion 121, a first spring 122, a second spring 124, a first valve body 126 and a second valve body 128. First valve body 126 defines a first calibrated aperture 130 and second valve body 128 defines a second calibrated aperture 132. Piston assembly 112 is disposed within a fluid chamber defined by housing assembly 110. Piston 120 separates the fluid chamber into a lower fluid chamber 134 and an upper fluid chamber 136. A washer 138 is disposed between upper housing 114 and middle housing 116 to define a radial fluid passage 140.

Piston rod 34 defines a radial fluid passage 142 which communicates with upper working chamber 44 and an axial fluid passage 144. Upper housing 114 defines an axial fluid passage 146 which is in fluid communication at one end with an axial fluid passage 144 and is in fluid communication with an axial fluid passage 148 defined by washer 138. Axial fluid passage 148 is in fluid communication with radial fluid passage 140 which is in fluid communication with an axial fluid passage 150 extending between upper housing 114 and middle housing 116. Axial fluid passage 150 is in fluid communication with a radial fluid passage 152 defined by middle housing 116, which is in fluid communication with an axial fluid passage 154 defined in part by piston 120, which in turn is in fluid communication with a radial fluid passage 156 defined by middle housing 116. Radial fluid passage 156 is in fluid communication with lower working chamber 46. Thus, a bypass fluid passage between upper working chamber 44 to lower working chamber 46 bypassing piston body 60, as illustrated by arrow 200, is formed through passages 142, 144, 146, 134, 148, 150, 152, 154 and 156. The bypass fluid passage 200 is formed in part by the outer surface portion 121 of the piston. Control of the amount of fluid flow between upper working chamber 44 and lower working chamber 46 through fluid passage 200 is accomplished by the movement of piston 120, which closes off radial passage 152 during a rebound stroke, and which closes off radial fluid passage 156 during a compression stroke as discussed below.

FIG. 3 illustrates fluid flow during a compression stroke of shock absorber 20. During a compression stroke, fluid pressure in lower working chamber 46 and in compression flow passages 76 increases. The fluid pressure in compression flow passages 76 will increase until the biasing load on valve plate 80 increases to the point that spring 84 is compressed and valve plate 80 is lifted entirely off of piston body 60 to fully open compression flow passages 76 as illustrated by arrow 86. Compression valve assembly 62 is a passive valve assembly with a firm damping characteristic.

At the beginning of the compression stroke, prior to the opening of compression valve assembly 62, fluid will flow through fluid passage 200 of frequency dependent valve assembly 66. The fluid pressure in lower working chamber 46 will react against second valve body 128 and the compression of second spring 124 will begin. As second spring 124 is compressed, fluid will flow between second valve body 128 and lower housing 118 and through a fluid passage 158 defined between second valve body 128 and middle housing 116 into lower fluid chamber 134. Fluid pressure will react against piston 120 to move piston 120 upward as illustrated in FIG. 3. Fluid in upper chamber 136 will be forced to flow through first calibrated aperture 130 due to the movement of piston 120. The upward movement of piston 120 will progressively close off radial fluid passage 156 which will progressively reduce the fluid flow through fluid passage 200.

Thus, for high frequency movements of frequency dependent valve assembly 66 in compression, there will be two flow paths as illustrated by arrows 86 and 200. The high frequency movement of frequency dependent valve assembly 66 causes piston 120 to move only a small distance. Because of the high frequency movement of frequency dependent valve assembly 66, fluid flow through first calibrated aperture 130 will be limited thus limiting the amount of movement of piston 120. The size of first calibrated aperture 130 will control the movement of piston 120 and thus the frequency profile at which frequency dependent valve assembly 66 reacts. The small movements of piston 120 will have little effect on the flow through flow path 200 thus creating a soft damping characteristic. During a low frequency movement of frequency dependent valve assembly 66, piston 120 will move a larger more significant distance. Because of the low frequency movement of frequency dependent valve assembly 66, fluid flow through first calibrated aperture 130 will increase due to the lower frequency of movement. This larger movement of piston 120 will begin the gradual closing of radial fluid passage 156 which will cause the gradual closing of fluid path 200. The smooth closing of fluid path 200 will provide a smooth transition from an initially soft damping to a firm damping condition for shock absorber 20. The slow closing of fluid passage 200 by the movement of piston 120 will provide the smooth transition.

FIG. 4 illustrates fluid flow during a rebound or extension stroke of shock absorber 20. During a rebound or extension stroke, fluid pressure in upper working chamber 44 and in rebound flow passages 78 increases. The fluid pressure in rebound flow passages 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke, prior to the opening of rebound valve assembly 64, fluid will flow through fluid passage 200 of frequency dependent valve assembly 66. The fluid pressure in upper working chamber 44 will react against first valve body 126 and the compression of first spring 122 will begin. As first spring 122 is compressed, fluid will flow between first valve body 126 and middle housing 116 and through a fluid passage 160 defined between first valve body 126 and middle housing 116 into upper fluid chamber 136. Fluid pressure will react against piston 120 to move piston 120 downward as illustrated in FIG. 3. Fluid in lower chamber 134 will be forced to flow through second calibrated aperture 132 due to the movement of piston 120. The downward movement of piston 120 will progressively close off radial fluid passage 152 which will progressively reduce the fluid flow through fluid passage 200.

Thus, for high frequency movements of frequency dependent valve assembly 66 in rebound there will be two flow paths as illustrated by arrows 94 and 200. The high frequency movement of frequency dependent valve assembly 66 causes piston 120 to move only a small distance. Because of the high frequency movement of frequency dependent valve assembly 66, fluid flow through second calibrated aperture 132 will be limited thus limiting the amount of movement of piston 120. The size of second calibrated aperture 132 will control the movement of piston 120 and thus the frequency profile at which frequency dependent valve assembly 66 reacts. The small movements of piston 120 will have little effect on the flow through flow path 200 thus creating a soft damping characteristic. During a low frequency movement of frequency dependent valve assembly 66, piston 120 will move a larger more significant distance. Because of the low frequency movement of frequency dependent valve assembly 66, fluid flow through second calibrated aperture 132 will increase due to the lower frequency of movement. This larger movement of piston 120 will begin the gradual closing of radial fluid passage 152 which will cause the gradual closing of fluid path 200. The smooth closing of fluid path 200 will provide a smooth transition from an initially soft damping to a firm damping condition for shock absorber 20. The slow closing of fluid passage 200 by the movement of piston 120 will provide the smooth transition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
   a pressure tube defining a first fluid chamber;
   a piston assembly disposed within the pressure tube, said piston assembly dividing said first fluid chamber into an upper working chamber and a lower working chamber;
   a piston rod projecting out of said pressure tube, said piston assembly being attached to said piston rod;
   a frequency dependent valve assembly attached to said piston rod, said frequency dependent valve assembly comprising:
      a housing assembly attached to said piston rod, said housing assembly defining a second fluid chamber;
      a piston disposed within said second fluid chamber and axially centered within the pressure tube, the piston having opposing first and second sides;
      a bypass fluid passage bypassing said piston assembly, the bypass fluid passage being defined in part by said housing assembly and by an outer wall surface of the piston, and by first and second spaced apart radial flow passages, and the bypass fluid path further enabling bi-directional fluid flow between the upper and lower working chambers depending on a direction of movement of the piston rod, wherein:
   pressure acting on said first side of said piston during a compression stroke of said piston assembly controls movement of said piston within said second fluid chamber in a first direction, which in turn controllably blocks fluid flow through said first radial flow passage, to thus control an amount of fluid flowing through said bypass fluid passage during said compression stroke; and
   pressure acting on said second side of said piston during an extension stroke of said piston assembly controls movement of said piston within said second fluid chamber in a second direction linearly opposite to said first direction, which in turn controllably blocks fluid flow through said second radial flow passage, to thus also control a flow of fluid flowing through said bypass fluid passage during said extension stroke of said piston assembly.

2. The shock absorber according to claim 1, wherein said frequency dependent valve assembly controls fluid flow from said upper working chamber to said lower working chamber.

3. The shock absorber according to claim 2, wherein said frequency dependent valve assembly controls fluid flow from said lower working chamber to said upper working chamber.

4. The shock absorber according to claim 1, wherein said frequency dependent valve assembly controls fluid flow from said lower working chamber to said upper working chamber.

5. The shock absorber according to claim 1, wherein said piston rod defines a fluid passage extending between said upper working chamber and said fluid chamber.

6. The shock absorber according to claim 1, wherein said frequency dependent valve assembly further comprises:
   a first spring disposed between said first side of said piston and said housing assembly; and
   a second spring disposed between said second side of said piston, opposite to said first side, and said housing assembly.

7. The shock absorber according to claim 6, wherein said frequency dependent valve assembly further comprises:
   a first valve body disposed between said first spring and said housing assembly; and
   a second valve body disposed between said second spring and said housing assembly.

8. The shock absorber according to claim 7, wherein said frequency dependent valve assembly further comprises a washer disposed between said second valve body and said housing assembly.

9. The shock absorber according to claim 8, wherein said bypass passage is defined between said washer and said housing assembly.

10. The shock absorber according to claim 9, wherein said housing assembly includes a first housing and a second housing attached to said first housing, said bypass passage being defined between said washer and said second housing.

11. The shock absorber according to claim 1, wherein said housing assembly includes a first housing and a second housing attached to said first housing, said bypass passage being defined between said first housing and said second housing.

12. The shock absorber according to claim 11, wherein said bypass passage is defined between said piston and said second housing.

13. The shock absorber according to claim 1, wherein said bypass passage is defined between said piston and said housing assembly.

14. A shock absorber comprising:
   a pressure tube defining a first fluid chamber;
   a piston assembly disposed within the pressure tube, said piston assembly dividing said first fluid chamber into an upper working chamber and a lower working chamber;
   a piston rod projecting out of said pressure tube, said piston assembly being attached to said piston rod;
   a frequency dependent valve assembly attached to said piston rod, said frequency dependent valve assembly comprising:
      a housing assembly attached to said piston rod and axially centered within the pressure tube, said housing assembly defining a second fluid chamber;
      a piston disposed within said second fluid chamber and axially centered within the housing assembly;
      a bypass fluid passage bypassing said piston assembly, the bypass fluid passage being defined in part by said housing assembly, by an outer wall surface of the piston, and by a pair of spaced apart, radial flow passages, to permit selective bidirectional flow of the fluid within the pressure tube through the bypass fluid passage and between the upper and lower working chambers; wherein
   linear movement of said piston within said second fluid chamber in first and second directions, in response to fluid pressure in said upper and lower working chambers, controls selective opening and closing of the radial flow passages, using the outer wall surface of the piston, both during a compression movement of the piston assembly and during an extension movement of said piston assembly, and such that a different one of the pair of spaced apart radial flow passages is controllably blocked during the compression and extension movements during low frequency movement of the piston assembly.

* * * * *